(12) United States Patent
Wada et al.

(10) Patent No.: US 6,441,876 B1
(45) Date of Patent: Aug. 27, 2002

(54) LIQUID CRYSTAL DISPLAY DEVICE AND METHOD OF PRODUCING THE SAME

(75) Inventors: Tomohiro Wada, Kagoshima; Takusei Sato, Tokyo, both of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/871,122

(22) Filed: May 31, 2001

(30) Foreign Application Priority Data

May 31, 2000 (JP) .................................... 2000-162775

(51) Int. Cl.$^7$ .............................................. G02F 1/1335
(52) U.S. Cl. ........................................ 349/111; 379/151
(58) Field of Search .................................... 349/151, 111, 349/110

(56) References Cited

U.S. PATENT DOCUMENTS

| | | | |
|---|---|---|---|
| 5,739,880 A | 4/1998 | Suzuki et al. | 349/110 |
| 5,851,411 A | 12/1998 | An et al. | 216/23 |
| 6,011,607 A | * 1/2000 | Yamazaki et al. | 349/153 |
| 6,151,091 A | * 11/2000 | Muramatsu | 349/149 |
| 6,304,307 B1 | * 10/2001 | Nishi et al. | 349/151 |

FOREIGN PATENT DOCUMENTS

| | | |
|---|---|---|
| EP | 0793135 | 9/1997 |
| JP | 9050044 | 2/1987 |
| WO | WO99/39239 | 8/1999 |

* cited by examiner

*Primary Examiner*—James Dudek
(74) *Attorney, Agent, or Firm*—Sonnenschein, Nath & Rosenthal

(57) ABSTRACT

A TFT substrate is provided near its outer periphery with a metallic wiring and pad portions, and a conductive light-shielding film is provided on the outside of these. The conductive light-shielding film is left annularly along the outer peripheral portion of the TFT substrate so that, when an upper layer light-shielding film is formed on the TFT substrate, the upper layer light-shielding film on the scribed line side would not easily be exfoliated at the time of etching or cleaning. Of the conductive light-shielding film, the position of the conductive light-shielding film disposed on the outside of the pad portions is shifted to the outer side so that the spacing between the conductive light-shielding film and the pad portions is set to be, for example, not less than 10 μm. By this, electrostatic trouble between the conductive light-shielding film and the pad portions is restrained.

8 Claims, 5 Drawing Sheets

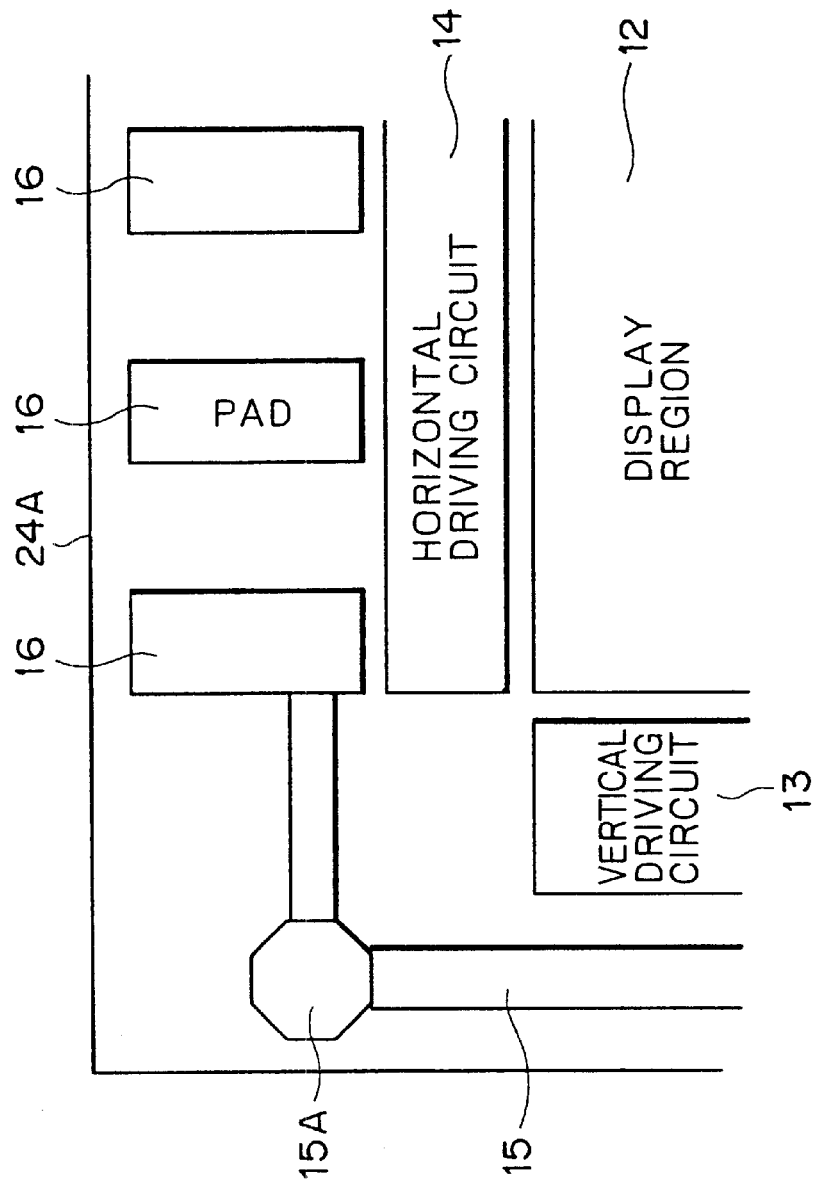

LIQUID CRYSTAL DISPLAY DEVICE AND METHOD OF PRODUCING THE SAME

RELATED APPLICATION DATA

The present application claims priority to Japanese Application No. P2000-162775 filed May 31, 2000, which application is incorporated herein by reference to the extent permitted by law.

BACKGROUND OF THE INVENTION

The present invention relates to a liquid crystal display device for use as various display devices and a method of producing the same.

Hitherto, there has been known a system in which a multiplicity of driving substrates (TFT substrates) with pixel transistors mounted thereon for constituting a liquid crystal display device are formed en bloc on a substrate (wafer) and individual TFT substrates are obtained by splitting the substrate along scribed lines.

FIG. 3 is a plan view showing an example of a wiring pattern on such a conventional TFT substrate, and FIG. 4 is a partly sectional view showing an internal laminated structure in the region of line A—A of FIG. 3.

As shown in FIG. 3, the region for forming one TFT substrate 10 is demarcated by scribed lines 2 formed in a grating form on a wafer 1, and each TFT substrate 10 is provided with a display region 12 in which pixel transistors 11 are disposed in a matrix form.

On the outside of the display region 12, there are provided a vertical driving circuit 13 and a horizontal driving circuit 14 for driving each pixel transistor in the display region 12, and, further, on the outside thereof, there are provided a metallic wiring 15 and a plurality of pad portions 16.

The pad portions 16 are arranged in parallel with and along one side of the display region 12 where the horizontal driving circuit 14 is disposed. These pad portions 16 are connected to the metallic wiring 15, and are brought into contact with terminals of an inspection apparatus or the like. Some of the pad portions 16 are provided as dummies which are not connected to the metallic wiring 15.

Common electrode portions 15A are provided at corner portions of the metallic wiring 15, for supplying electric power to each of the driving circuits 13, 14 and the like.

In FIG. 4, a polycrystalline silicon film 22 is provided on an interlayer insulation film 21 provided on a quartz substrate 20, and an Al electrode film 23 and an upper layer light-shielding film 24 are provided thereon. A transparent electrode 26 is provided on the upper side of the upper layer light-shielding film 24, with an interlayer insulation film 25 therebetween.

Interlayer insulation films 27 and 28 are provided at an outer peripheral portion of the polycrystalline silicon film 22, and have an upwardly projected form, thereby forming the groove of the scribed lines.

The upper layer light-shielding film 24 is a conductive light-shielding film formed, for example, of an alloy of Al, Ti or the like. The transparent electrode 26 is constituted of an ITO film or the like, and the interlayer insulation film 25 is constituted of a P-type TEOS film, a SOG (spin on glass) film or the like. The other interlayer insulation films are constituted by appropriately using a silicon oxide film, a silicon nitride film or the like.

In the production of such a TFT substrate, in order to alleviate warpage of the wafer due to stress, each thin film formed on the scribed lines is removed by dry or wet etching and lithography upon each formation of the thin film.

Therefore, the groove of the scribed lines is deepened at the stage of forming the upper-layer light-shielding layer 24, the upper-layer light-shielding layer 24 is left at bottom portions of the scribed lines at the time of processing the upper-layer light-shielding layer 24, and the left portions are exfoliated in cleaning after the processing or the like, leading, for example, to inter-pixel shortcircuit.

In consideration of this problem, as shown in FIG. 4, a structure has been adopted in which the upper-layer light-shielding film is left annularly along the outer peripheral portion of the TFT substrate so that the upper-layer light-shielding film would not easily be exfoliated.

However, where the upper-layer light-shielding film is left annularly along the outer peripheral portion of the TFT substrate, as shown in FIG. 5, the upper-layer light-shielding film 24 (shown by solid line 24A in FIG. 5) is disposed also in the vicinity of the above-mentioned pad portions 16, and the presence of such annular upper-layer light shielding film 24 results in that damage due to static electricity is liable to occur in a liquid crystal step.

As a countermeasure against this problem, the annular upper-layer light-shielding film may be formed at a position away from the pad portions, to thereby prevent the bad influence of static electricity. However, since various registration marks and TEG are disposed on the scribed lines, formation of the annular upper-layer light-shielding film at positions away from the center of the TFT substrate along the entire periphery of the TFT substrate results in that it is necessary to widen the scribed lines for providing a layout space. In addition, chip size is enlarged, and, hence, yield from the TFT substrates is reduced.

SUMMARY OF THE INVENTION

In consideration of the above-mentioned situations of the prior art, it is an object of the present invention to provide a liquid crystal display device and a method of producing the same capable of restraining the generation of electrostatic troubles attendant on proximate formation of the annular upper-layer light-shielding film and pads on the TFT substrate without causing an increase in chip size.

In order to attain the above object, according to a first aspect of the present invention, there is provided a liquid crystal display device including one of a plurality of driving substrates formed en bloc on a substrate and produced individually by splitting the substrate along scribed lines, the liquid crystal display device including: a conductive light-shielding film formed annularly along a peripheral portion of the driving substrate, and a plurality of pad portions arranged on the inside of the conductive light-shielding film along one side of the driving substrate, wherein the spacing between the conductive light-shielding film and each pad at the side of the driving substrate where the pad portions are provided is at least 10 μm.

According to a second aspect of the present invention, there is provided a method of producing a liquid crystal display device including one of a plurality of driving substrates formed en bloc on a substrate and produced individually by splitting the substrate along scribed lines, the method including: a step of forming a conductive light-shielding film annularly along a peripheral portion of the driving substrate, and a step of forming a plurality of pad portions arranged on the inside of the conductive light-shielding film along one side of the driving substrate, wherein the spacing between the conductive light-shielding film and each pad at the side of the driving substrate where the pad portions are provided is at least 10 µm.

In the liquid crystal display device according to the present invention, the spacing between the conductive light-shielding film and each pad at the side of the driving substrate where the pad portions are provided is at least 10 µm.

The spacing of at least 10 µm has been found to be a value capable of reducing the rate of troubles occurring due to static electricity. Therefore, by setting the spacing between the conductive light-shielding film and each pad to be at least 10 µm, troubles due to static electricity between the conductive light-shielding film and each pad can be restrained.

In addition, since the spacing of at least 10 µm between the conductive light-shielding film and each pad is provided only at the side of the driving substrate where the pad portions are disposed, the conductive light-shielding film is not spaced away from the center along the entire periphery of the driving substrate, and the desired layout can be realized without much enlarging the chip size.

Also, in the method of producing a liquid crystal display device according to the present invention, the spacing between the conductive light-shielding film and each pad at the side of the driving substrate where the pad portions are provided is set to be at least 10 µm.

Therefore, by setting the spacing between the conductive light-shielding film and each pad to be at least 10 µm, troubles due to static electricity between the conductive light-shielding film and each pad can be restrained.

Besides, the spacing of at least 10 µm between the conductive light-shielding film and each pad is provided only at the side of the driving substrate where the pad portions are provided, the conductive light-shielding film is not spaced away from the center along the entire periphery of the driving substrate, and the desired layout can be realized without much increasing the chip size.

The above and other objects, features and advantages of the present invention will become apparent from the following description and appended claims, taken in conjunction with the accompanying drawings which show by way of example some preferred embodiments of the invention.

BRIEF DESCRIPTION OF THE DRAWINGS

FIG. 5 is a plan view of major part showing the layout relationship of pad portions and a conductive light-shielding film on the TFT substrate shown in FIG. 3.

DETAILED DESCRIPTION OF THE PREFERRED EMBODIMENTS

Now, embodiments of a liquid crystal display device and a method of producing the same according to the present invention will be described.

Figure 1:
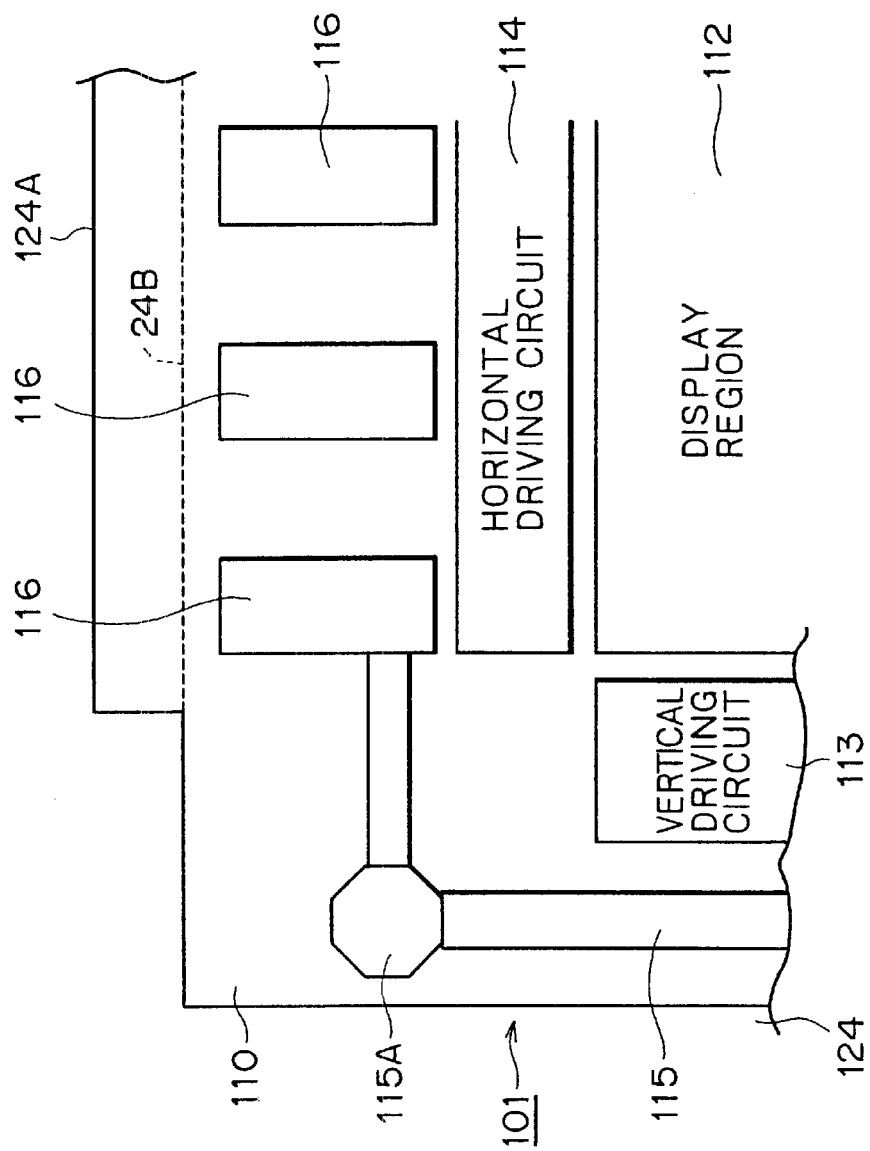
FIG. 1 is a plan view of major part showing the layout relationship of pad portions and a conductive light-shielding film on a TFT substrate of a liquid crystal display device according to a first embodiment of the present invention.
Figure 2:
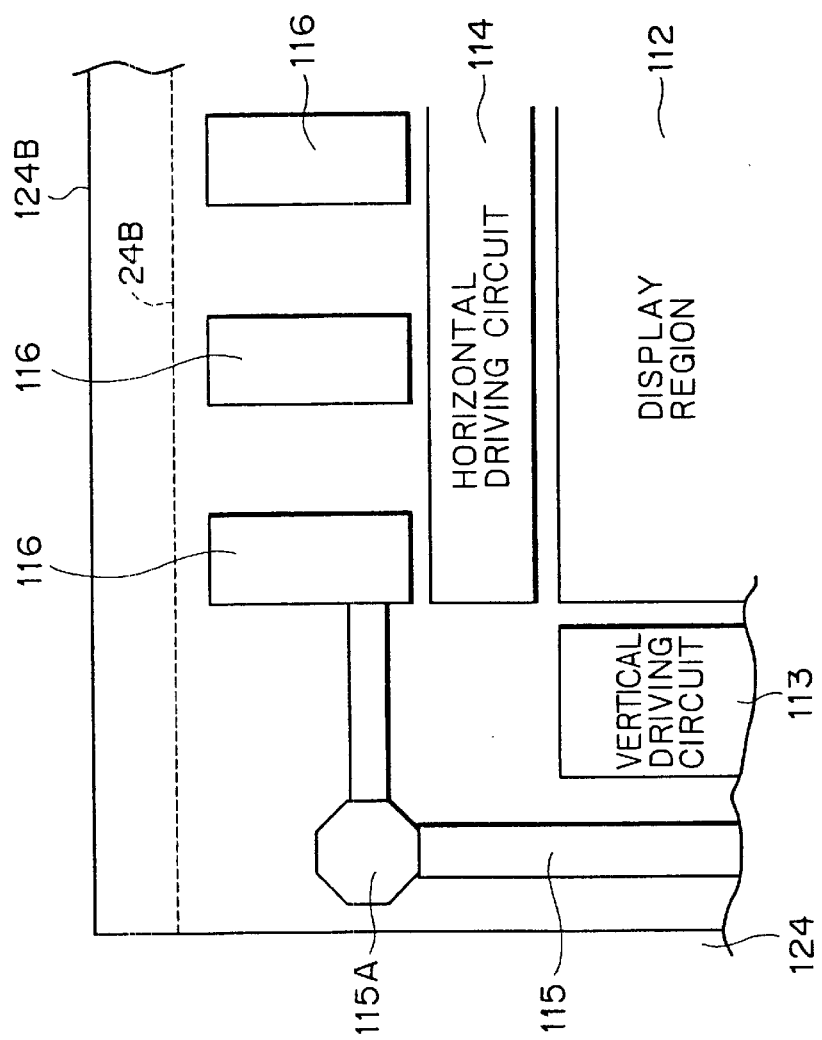
FIG. 2 is a plan view of major part showing the layout relationship of pad portions and a conductive light-shielding film on a TFT substrate of a liquid crystal display device according to a second embodiment of the present invention.
Figure 3:
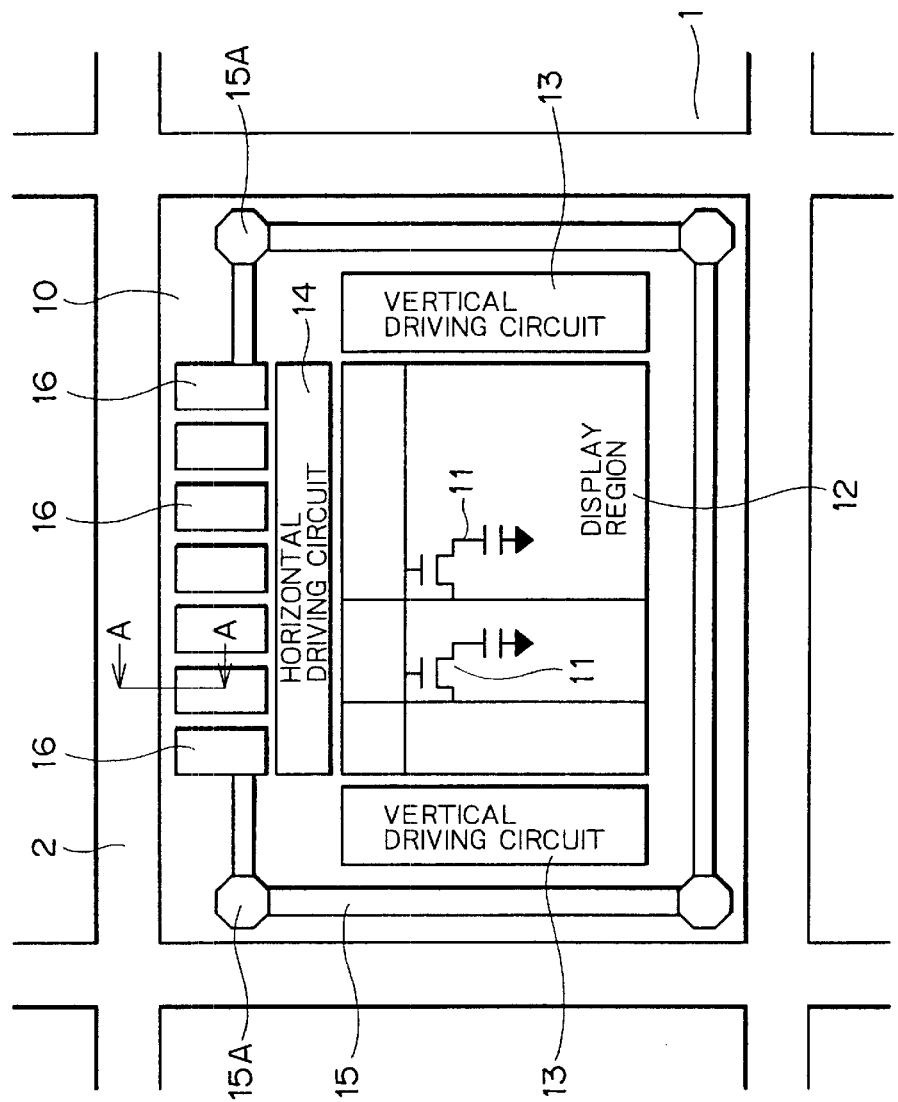
FIG. 3 is a plan view showing an example of a wiring pattern on a TFT substrate according to the prior art.
Figure 4:
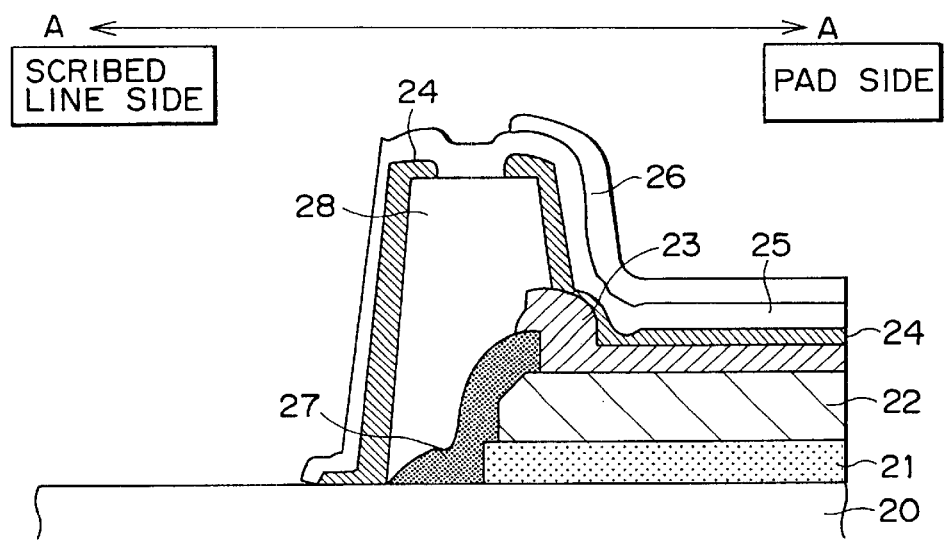
FIG. 4 is a partly sectional view showing the internal laminated structure in a region shown by line A—A of FIG. 3.

FIG. 1 is a plan view of major part showing the layout relationship of pad portions and a conductive light-shielding film on a TFT substrate of a liquid crystal display device according to a first embodiment of the present invention.

The TFT substrates 110 of this embodiment are formed in regions demarcated by scribed lines (omitted in FIG. 1) formed in a grating form on a wafer 101, and a plurality of the TFT substrates 110 are formed en bloc by splitting the wafer 101 along the scribed lines.

The TFT substrate 110 is provided with a display region 112 in which pixel transistors (omitted in FIG. 1) are disposed in a matrix form at a central area. A vertical driving circuit 113 and a horizontal driving circuit 114 for driving each of the pixel transistors in the display region 112 are provided on the outside of the display region 112. Further, a metallic wiring 115 and a plurality of pad portions 116 are provided on the outside of the driving circuits 113 and 114.

The pad portions 116 are arranged in parallel with and along one side of the display region 112 where the horizontal driving circuit 114 is provided. The pad portions 116 are connected to the metallic wiring 115, and are brought into contact with terminals of an inspection apparatus or the like. Some of the pad portions 116 are provided as dummies which are not connected to the metallic wiring 115.

Common electrode portions 115A are provided at corner portions of the metallic wiring 115, whereby electric power is supplied to each of the driving circuits 113, 114 and the like.

A conductive light-shielding film 124 is provided on the outside of the metallic wiring 115 and the pad portions 116.

The conductive light-shielding film 124 is formed in a tetragonal annular shape along the outer periphery of the TFT substrate 110, and is left in the annular form along the outer periphery of the TFT substrate 110 to ensure that, when an upper-layer light-shielding film is formed on the TFT substrate 110, the upper-layer light-shielding film on the side of the scribed lines would not easily be exfoliated at the time of etching or cleaning.

The conductive light-shielding film 124 can be formed in a thickness of 50 to 500 nm by use of a combination of W, Mo, Ta, Cr, Ti, Al, Cu, Zn, silicides of these elements and alloys of these elements. The conductive light-shielding film 124 has a low resistance of not more than 200 KΩ/□, and has a transmittance to at least light in the range of 400 to 500 nm of not more than 10%.

In this embodiment, the position of the conductive light-shielding film 124A disposed on the outside of the pad portions 116 is shifted outwards by 147 nm as compared with the prior art (shown by broken line 24B in FIG. 1) shown in FIG. 5, whereby the spacing between the conductive light-shielding film 124A and the pad portions 116 is set to be, for example, not less than 10 µm.

Namely, as shown in FIG. 1, of the annular conductive light-shielding film 124, only the conductive light-shielding film 124A at the portion where the pad portions 116 are arranged is formed on the outer side by 147 nm.

Attendant on such a change in the position and shape of the conductive light-shielding film 124, the position and shape of the scribed line are also set according to the conductive light-shielding film 124, 124A.

In the case of producing such a TFT substrate, for example, films of Al, TiON and Ti are sequentially formed in thicknesses of 100 nm, 50 nm and 100 nm, and are patterned by etching and the like, whereby a belt-like pattern with a width of 6 µm in plan view is formed.

Thereafter, a film of P-TEOS is provided in a thickness of 100 nm, then a film of SOG is provided in a thickness of 400 nm to form an interlayer insulation film, a contact hole is opened, and transparent pixel electrodes consisting of an ITO film with a thickness of 70 nm are formed.

With such a structure, a press bonding margin in press bonding between the pad portions and a flexible substrate is enlarged, and possibility of shortcircuit between the pad portions and the flexible substrate due to static electricity can be reduced.

While in the above example, of the annular conductive light-shielding film 124, the conductive light-shielding film 124A in the range where the PAD portions 116 are arranged is spaced apart from the PAD portions 116, of the conductive light-shielding film 124, the conductive light-shielding film 124A along the side where the PAD portions 116 are arranged may be entirely spaced apart from the PAD portions 116.

In this case, the other points of constitution are the same as in the example shown in FIG. 1, and the description thereof is omitted.

While in the above example the conductive light-shielding film is left at an outer peripheral portion of the TFT substrate after the TFT substrates are separated from the wafer at the scribed lines, the conductive light-shielding film may be-formed at a position largely retracted from the PAD portions so that the conductive light-shielding film is also cut away when the TFT substrates are separated from the wafer at the scribed lines.

According to such a method of fabrication, the conductive light-shielding film is absent in the vicinity of the pad portions at the time of press bonding between the pad portions and the flexible substrate, so that the possibility of shortcicuit between the PAD substrate and the flexible substrate due to static electricity can be reduced more assuredly.

Incidentally, in the embodiment as described above, a certain effect can be obtained if the position of the conductive light-shielding film 124A is spaced from the PAD portions by not less than 5 $\mu$m. For obtaining an assured effect, however, the spacing is set to be not less than 10 $\mu$m, with a more preferable range of the spacing being 150 to 200 $\mu$m.

Besides, since the conductive light-shielding film is a cause of capacitance of coupling with adjacent wiring, the conductive light-shielding film preferably has a low resistance of not more than 100 K$\Omega$/□, more preferably not more than 10 K$\Omega$/□.

What is claimed is:

1. A liquid crystal display device comprising one of a plurality of driving substrates formed en bloc on a substrate and produced individually by splitting said substrate along scribed lines, said liquid crystal display device comprising:

a conductive light-shielding film formed annularly along a peripheral portion of said driving substrate, and a plurality of pad portions arranged on the inside of said conductive light-shielding film along one side of said driving substrate, wherein the spacing between said conductive light-shielding film and each said pad at the side of said driving substrate where said pad portions are provided is at least 10 $\mu$m.

2. A liquid crystal display device as set forth in claim 1, wherein said conductive light-shielding film is formed by use of a combination of W, Mo, Ta, Cr, Ti, Al, Cu, Zn, silicides of these elements and alloys of these elements.

3. A liquid crystal display device as set forth in claim 1, wherein said conductive light-shielding film has a thickness of 50 to 500 nm.

4. A liquid crystal display device as set forth in claim 1, wherein said conductive light-shielding film has a low resistance of not more than 200 K$\Omega$/□.

5. A liquid crystal display device as set forth in claim 1, wherein said conductive light-shielding film has a transmittance to at least light in the range of 400 to 500 nm of not more than 10%.

6. A method of producing a liquid crystal display device comprising one of a plurality of driving substrates formed en bloc on a substrate and produced individually by splitting said substrate along scribed lines, said method comprising:

a step of forming a conductive light-shielding film annularly along a peripheral portion of said driving substrate, and a step of forming a plurality of pad portions arranged on the inside of said conductive light-shielding film along one side of said driving substrate, wherein the spacing between said conductive light-shielding film and each said pad at the side of said driving substrate where said pad portions are provided is at least 10 $\mu$m.

7. A method of producing a liquid crystal display device as set forth in claim 6, wherein said conductive light-shielding film is formed at the same time when a wiring for pixel transistors or a peripheral driving circuit is formed or when a light-shielding thin film is formed, and is patterned at the same time when said wiring or said light-shielding thin film is patterned.

8. A method of producing a liquid crystal display device as set forth in claim 6, wherein said conductive light-shielding film is present on said substrate only when said substrate is processed, and is removed when said driving substrates are split.

* * * * *